United States Patent [19]

Tseng

[11] Patent Number: 5,785,963

[45] Date of Patent: Jul. 28, 1998

[54] POLYMERIC HYDANTOIN QUATERNARY COMPOUNDS, METHODS OF MAKING

[75] Inventor: Chuen-Ing J. Tseng, Lawrenceville, N.J.

[73] Assignee: Lonza, Inc., Annandale, N.J.

[21] Appl. No.: 624,763

[22] Filed: Mar. 27, 1996

[51] Int. Cl.⁶ .................. A61K 31/785; A61K 31/77; C08G 73/06; C08G 65/24

[52] U.S. Cl. .................. 424/78.36; 528/367; 528/421; 528/423; 528/397; 424/78.07; 523/122

[58] Field of Search .................. 424/78.01, 78.36, 424/78.07; 528/367, 397, 421, 423; 523/122

[56] References Cited

U.S. PATENT DOCUMENTS

| | | |
|---|---|---|
| 3,889,036 | 6/1975 | Preston . |
| 3,903,053 | 9/1975 | Iwata et al. . |
| 3,925,310 | 12/1975 | Wolf et al. . |
| 3,928,298 | 12/1975 | Wolf et al. . |
| 4,053,441 | 10/1977 | Wagener et al. . |
| 4,073,924 | 2/1978 | Sonntag . |
| 4,073,926 | 2/1978 | Sonntag et al. . |
| 4,073,927 | 2/1978 | Freilich . |
| 4,939,227 | 7/1990 | Wang . |

*Primary Examiner*—Edward J. Webman
*Attorney, Agent, or Firm*—Darby & Darby

[57] ABSTRACT

The present invention relates to a class of novel polymeric hydantoin quaternary compounds, obtained either via a reaction of a hydantoin diamine and an organic dihalide or epichlorohydrin or via a reaction of hydantoin dichloride with an organic diamine. These polymeric hydantoin quaternary compounds have unexpected properties which make them very useful as low foaming biocidal, fungicidal and algicidal agents.

14 Claims, No Drawings

POLYMERIC HYDANTOIN QUATERNARY COMPOUNDS, METHODS OF MAKING

BACKGROUND OF THE INVENTION

Compounds which possess a multiplicity of antimicrobial activities and which are nontoxic to mammals are much sought after. Moreover, compounds which are able to perform two functions at once, such as kill bacteria and be low foaming, are increasingly important in this day of environmental and economic awareness.

The polymeric hydantoin quaternaries of the present invention have not been previously described in the literature. Both monofunctional hydantoin quaternaries (see Gutkowska, B. and Wasiak (1984) *J. Acta Pol. Pharm.* 41: 307; Lapina, R. A. et al. (1983) *Otkrytiya, Izobret., Prom. Obraztoy, Touannye Znaki* 15: 262; U.S. Pat. No. 4,073,926 issued to Sonntag and Freilich; and U.S. Pat. No. 4,073,924 issued to Sonntag) and difunctional quaternaries (see U.S. Pat. No. 4,073,927 issued to Freilich; and Vinogradova, N. D. et al. (1981) *Khim.-Farm. Zn.* 15: 44) as well as polymeric quaternary compounds have been described in the literature. None of these prior art references teach or suggest polymeric hydantoin quaternaries or their use as a low foaming biocide, and clearly the compounds for which micro efficacy data were given are high foaming.

BRIEF DESCRIPTION OF THE INVENTION

It has been discovered that polymeric hydantoin quaternary ammonium compounds (PHQs) have antibacterial, antialgal, and antifungal properties, and are extremely low foaming relative to the monomeric species. This is a great advantage when working with aqueous solutions which need to be aerated, agitated, or filtered. In addition, they are non-irritating and readily soluble in water, eliminating the need for dispersants or emulsifiers during dilution.

The novel polymeric hydantoin quaternary ammonium compounds of the present invention have disubstituted hydantoin ring bridges between the quaternary ammonium moieties in the polymer backbone.

This invention also relates to bactericidal, fungicidal, and algicidal compositions containing as an active ingredient polymeric hydantoin quaternary ammonium compounds, and their use for reducing and killing bacterial, fungal, and algal populations in a broad range of habitats. This invention also relates to methods for making these novel PHQs.

DETAILED DESCRIPTION OF THE INVENTION

The general formula of the novel polymeric hydantoin quaternary ammonium compounds of the present invention is as follows:

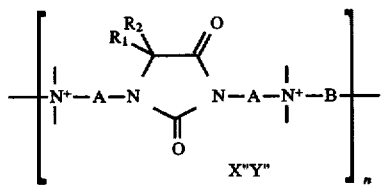

wherein

X and Y are Cl, Br, or I;

$R_1$ and $R_2$, which may be the same or different, are selected from the group consisting of hydrogen; alkyl groups of 1 to 18 carbons, preferably 1 to 6 carbons; alkenyl groups of 1 to 18 carbons, preferably 1 to 6 carbons; alkynyl groups of 1 to 18 carbons, preferably 1 to 6 carbons; or substituted derivatives thereof where the substitution may be alkyl or alkoxy or phenyl groups; $R_1$ and $R_2$ taken together may be a cycloaliphatic group of 4 or 5 carbon atoms; A and B may be $-(CH_2)_m-$; $-(CH_2)_mCH=CH(CH_2)_p-$; $(CH_2)_mC\equiv C(CH_2)_p-$; $-(CH_2)_mO(CH_2)_p-$; $-(CH_2)_mCHOH(CH_2)_p-$; $-(CH_2)_mNC(O)(CH_2)_p-$; or $-(CH_2)_mC_6H_4(CH)_p-$; m and p may be from 1 to 20; and n, the degree of polymerization, may be from 1 to 3,000, preferably from 1 to 300.

The polymeric hydantoin quaternary ammonium compounds of the present invention may be prepared by reacting a hydantoin-based di-tertiary-amine with an organic dihalide or epihalohydrin. The polymeric hydantoin quaternary ammonium compounds of the present invention may also be prepared by reacting a hydantoin dichloride with an organic diamine. One of two hydantoin diamines are generally used to make the polymeric hydantoin quaternary ammonium compounds. These hydantoin diamines can be prepared by the reaction schemes set forth below.

Synthesis of Hydantoin Diamine (Formula II)

By way of example, the first reaction scheme can start with 1,3-bis(2-hydroxyethyl)-5,5-dimethyl hydantoin (Dantocol DHE, Lonza Inc., Fair Lawn, N.J.), which may be chlorinated with 2 to 5 moles, preferably 2 to 3 moles, of thionyl chloride at temperature range of −20° to 180° C., preferably 0°–100° C. The resulting compound is 1,3-bis(2-chloroethyl)-5,5-dimethyl hydantoin (Formula I below) which may be recrystallized from organic solvents such as ethyl acetate.

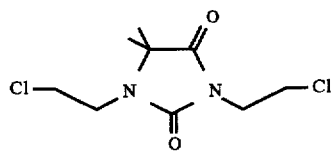

The 1,3-bis(2-hydroxyethyl)-5,5-dimethyl hydantoin can also be chlorinated with ⅔ to 2 moles, preferably ⅔ to 1 mole, of phosphorus trichloride in a pressure reactor. This reaction takes-place at a-temperature of 25° to 180° C., preferably 65° to 165° C.; and at a pressure of 0 to 300 psi . The reaction mixture is then cooled to a temperature of 80° to 100° C. The bottom phosphorous acid layer is removed and the resulting upper organic layer is hydantoin dichloride with formula I, which may be recrystallized from organic solvents such as ethyl acetate.

Amination of the compound of Formula I with dimethylamine yields the hydantoin diamine, Formula II:

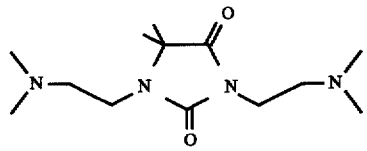

In this reaction, the 1,3-bis(2-chloroethyl)-5,5-dimethyl hydantoin (Formula I) is aminated with 2 to 10 moles, preferably 4 to 7 moles, of dimethylamine in a pressure reactor. The reaction takes place at 80° to 250° C., preferably at 120° to 180° C. The reaction mixture is then cooled to room temperature and 2 to 2.5 moles of NaOH are added. Other bases such as KOH can be used in place of NaOH to neutralize the dimethylamine.HCl salt and liberate dimethylamine for recovery. The by-product in this case will be KCl. The unreacted dimethylamine and water are removed by evaporation and isopropanol is added to the resulting slurry to precipitate out the salt as the reaction by-product. The slurry is then filtered, isopropanol evaporated and the hydantoin diamine of Formula II is obtained.

Synthesis of Hydantoin Diamine (Formula XVI)

As an example of the second general reaction scheme, the amination of 1,3-bis(2-carboxyethyl)-5,5-dimethyl hydantoin with dimethylaminopropylamine (DMAPA) yields the hydantoin diamine of Formula XVI:

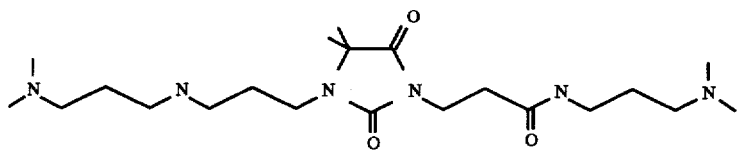

In this reaction, 1,3-bis(2-caboxyethyl)-5,5-dimethylhydantoin is reacted with 2 to 6 moles, preferably 2 to 3 moles, of DMAPA. The reaction may be performed neat or in a solvent, such-as toluene. Any organic solvent having a boiling range of 100°–200° C. which forms an azeotrope with water can be used. The reaction takes place at 100° to 200° C. Where a solvent is used, the reaction is run preferably at the reflux temperature of the solvent. The water generated from this reaction is removed. After the reaction is complete, the reactants are heated to a temperature of 120°–200° C. to remove the solvent.

It will be understood that these reaction schemes are representative of the general schemes that can be used to prepare the hydantoin diamines. Starting materials other than 1,3-bis(2-hydroxyethyl)-5,5-dimethyl hydantoin and 1,3-bis(2-carboxyethyl)-5,5-dimethyl hydantoin can be used in the reaction, such as

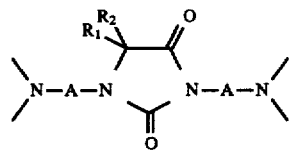

The starting materials that can be used in the reaction schemes have the general formula of 1,3-bis(2-hydroxy A)-5,5-$R_1R_2$ hydantoin, wherein $R_1$ and $R_2$ which may be the same or different, are selected from the group consisting of hydrogen; alkyl groups of 1 to 18 carbons, preferably 1 to 6 carbons; alkenyl groups of 1 to 18 carbons, preferably 1 to 6 carbons; alkynyl groups of 1 to 18 carbons, preferably 1 to 6 carbons; or substituted derivatives thereof where the substitution may be alkyl or alkoxy or phenyl groups; $R_1$ and $R_2$ taken together may be a cycloaliphatic group of 4 or 5 carbon atoms; A may be —$(CH_2)_m$—; —$(CH_2)_m CH=CH(CH_2)_p$—; —$(CH_2)_m C\equiv C(CH_2)_p$—; —$(CH_2)_m O(CH_2)_p$—; —$(CH_2)_m CHOH(CH_2)_p$—; —$(CH_2)_m NC(O)(CH_2)_p$—; or —$(CH_2)_m C_6H_4(CH_2)_p$—; and m and p may be from 1 to 20.

Polymerization

The resulting hydantoin diamines with Formula II or Formula XVI are polymerized by a reaction with an organic dihalide or epihalohydrin in the presence of HCl, HBr or HI to obtain the desired PHQ. In the polymerization with an organic dihalide, the hydantoin diamine is reacted with 0.5 to 3, preferably 0.8 to 1.2 moles of the organic dihalide. The reaction takes place at 25° to 160° C., preferably 25° to 100° C., in an aqueous or alcoholic solution (such as ethanol, isopropanol, propylene glycol, and ethylene glycol) containing 20 to 80 wt % of organic dihalide and hydantoin diamine.

The hydantoin amine is reacted with 0.5 to 2 moles, preferably 0.8 to 1.2 moles, of epichlorohydrin, in the presence of 0.5 to 2 moles, preferably 0.8 to 1.2 moles, of HCl, HBr or HI. The temperature of the reaction is 0° to 160° C., preferably 25° to 100° C.

The polymeric hydantoin quaternary compounds may also be prepared by the reaction of hydantoin dichloride (Formula I) with an organic diamine. In this reaction, the hydantoin dichloride is reacted with 0.5 to 2.0 moles, preferably 0.8 to 1.2 moles, of organic diamine such as N,N,N',N'-tetramethylethylene diamine. The reaction takes place at 25° to 160° C., preferably 25° to 100° C.

The PHQs of the invention may be characterized by their molecular weight and charge density. Broadly, the molecular weight and charge density may range from 500 to 1,000,000 g/mole and 2.0 to 8.0 meq/g, with ranges from 1,000 to 50,000 g/mole and 5.0 to 8.0 meq/g being preferred.

As a bactericidal or fungal agent, the compounds can be used as hard surface disinfectants in industrial and hospital settings and ready to use (RTU) products for home use. Effective use concentration ranges for biocidal use are from 100 to 10,000 ppm, preferably 500 to 5000 ppm, with 1000 ppm being most common.

As an algicide, the compounds can be used in swimming pools, both private and public spas, ponds and water used in cooling treatments. Effective concentration ranges are 1 to 200 ppm, with 5 to 50 ppm being preferred.

The following examples are illustrative of the present invention. It will be understood, however, that the invention is not limited to the specific compounds or applications set forth in the examples.

EXAMPLE I

Synthesis of 1,3-bis(2-chloroethyl)-5,5-dimethyl hydantoin (Formula I)

A 5 liter, 4necked round bottom flask equipped with stirrer, thermometer, condenser, addition funnel, nitrogen sparge line and a scrubber bath was set up for the chlorination reaction. The scrubber bath contained sufficient amount of 15% NaOH to neutralize the acidic gases, including HCl generated by the reaction.

To the above-round bottom flask, thionyl chloride (3035.0 grams, 25.5 moles) was charged and cooled to less than 20° C. To the flask, 1,3-bis(2-hydroxyethyl)-5,5-dimethyl hydantoin (10.6-moles, Dantocol DHE, Lonza) was slowly added over a period of 5 hours, while the reaction temperature was maintained at less than 20° C. The volatile gas generated from this reaction was collected and neutralized in the scrubber. After addition of the Dantocol DHE, the content of the reactor was allowed to stir at room temperature for 1 hour and heated slowly to 100° C. until gas evolution subsided. After addition of the Dantocol DHE, stripped with aspirator vacuum at 80°–100° C. to remove any volatile material. The reactor was cooled down to 60° C. and ethyl acetate (1000 milliliters) was added. Upon cooling to room temperature and filtration to remove ethyl acetate, 1,3-bis(2-chloroethyl)-5,5-dimethyl hydantoin (1908.4 grams) was obtained as white crystalline material (71.0% yield, 97.3% purity, mp 77°–79° C.).

Anal. found (cal'd): C, 42.69 (42.87); H, 5.73 (5.55); Cl, 10.79 (11.1)

Mass spec (m/e): 252.03 (M), 254.02 (M+2), 256.05 (M+4)

EXAMPLE II

Synthesis of 1,3-bis[2-(dimethylamino)ethyl]-5,5-dimethyl hydantoin (Formula I)

To a 2 liter, stainless Parr autoclave, 1,3-bis(2-chloroethyl)-5,5-dimethyl hydantoin (Formula I) (506 grams, 2.0 moles) and a 60% aqueous solution of dimethylamine (750 grams, 10.0 moles) was charged. The autoclave was sealed and heated slowly to and maintained at 160° C. for 2 hours. The reaction mixture was cooled to room temperature and 50% NaOH (330 grams, 4.125 moles) added. The unreacted dimethylamine and water was removed a rotary evaporator under water aspirator vacuum. Isopropanol (400 grams) was added to the resulting slurry and the slurry was filtered to remove the precipitated sodium chloride salt. The filtrate was concentrated to remove the isopropanol and obtain 1,3-bis[2-(dimethylamino)ethyl]-5,5-dimethyl hydantoin having Formula (II) (530 grams) with 95% purity (Theory 540.0 grams, yield 93.4%). The hydantoin diamine (II) was vacuum distilled (bp 133°–135° C./1–2 mmHg) to a clear, colorless liquid with 99% purity.

Anal. found (cal'd): C, 58.01 (57.55); H, 9.49 (9.62); N, 20.56 (20.74).

Equivalent Weight=135.44 (theory=135.17)

Mass Spec (m/e): 270.13 M), 271.14 (M+1)

EXAMPLE III

Preparation of poly[4,4-dimethyl-2,5-dioxo-1,3-imidazolidinediyl-1,2-ethanediyl(dimethyliminio)-1,2-ethanediyloxy-1,2-ethanediyl(dimethyliminio)-1,2-ethanediyl dichloride]

A. Via hydantoin diamine (II) with dichloroethylether

Water (62.4 grams), hydantoin diamine ) (40.5 grams, 0.150 mole) and dichloroethyl ether (1) (21.9 grams, 0.152 mole) were charged into a 200 milliliter reaction flask. The mixture was heated to 85°–90° C. and maintained at this temperature for 6 hours. The reaction was monitored by titrating the amount of residual unreacted amine and formation of quaternary compound. At the end of 6 hours, the analysis indicated a 97% conversion to the polyhydantoin quaternary with the following structure and a molecular weight of 11,000:

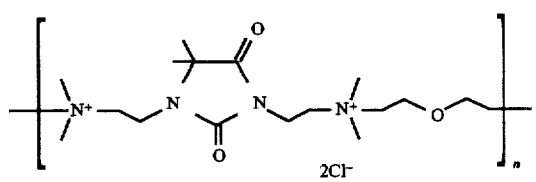

The resulting polyhydantoin quaternary was designated Formula III.

EXAMPLE IV

Preparation of poly[(4,4-dimethyl-2,5-dioxo-1,3-imidazolidinediyl-1,2-ethanediyl(dimethyliminio)(2-hydroxy-1,3-propanediyl(dimethyliminio)-1,2-ethanediyl dichloride]

A. Via organic dihalide

Water (80.0 grams), hydantoin diamine (II) (54.0 grams, 0.200 mole) and 1,3-dichloropropanol (26.05 grams, 0.202 mole) were added into a 250 milliliter reaction flask. The reaction mixture was slowly heated. At approximately 65° C., an exothermic reaction occurred and external cooling was applied to maintain the temperature at 65° C. After the exotherm subsided, the reaction mixture was heated to and maintained at 85°–90° C. for 5–6 hours. The clear, light yellow solution was cooled down to room temperature. Analysis showed 98% conversion to a polyhydantoin quaternary with the following structure and having a molecular weight of 14,900:

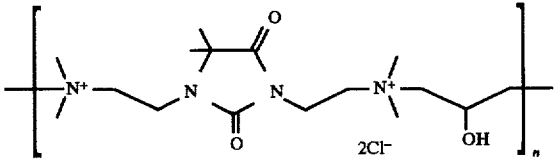

The resulting polyhydantoin quaternary was designated Formula IV.

B. Via epichlorohydrin

Hydantoin diamine (II) (474.1 grams, 1.750 moles) was charged into a 2 liter, 4-necked round bottom flask. A solution of 13.8% HCl (463 grams, 1.750 moles) was added to the reactor over a period of ½ hour at room temperature. During the HCl addition, an exotherm was observed. The reaction temperature was maintained at 30°–35° C. After HCl addition, the clear, colorless solution was heated to 75° C. and epichlorohydrin (164 grams, 1.77 moles) was added over a period of 2 hours. The reaction mixture was further stirred at 75° C. for 2 hours. Analysis indicated over 98% conversion to polyhydantoin quaternary with structure of Formula IV.

Several batches were prepared via this method, varying the molar ratio of epichlorohydrin to hydantoin diamine (II). The results were summarized below.

TABLE 1

| PHQ Designation | Epichlorohydrin/ Amine (II) Ratio | MW |
| --- | --- | --- |
| IV (A) | 1.05 | 13,300 |
| IV (B) | 0.95 | 23,800 |
| IV (C) | 1.00 | 24,600 |

EXAMPLE V

Preparation of poly[4,4-dimethyl-2,5-dioxo-1,3-imidazolidinediyl-1,2-ethanediyl(dimethylamino)-1,4-butanediyl-(dimethylimidio)-1,2-etanediyl dichloride]

Water (80.0 grams), hydantoin diamine (II) (54.0 grams, 0.200 mole) and 1,4-dichlorobutane (25.65 grams, 0.202 mole) were added into a 250 milliliter reaction flask. The reaction mixture was heated to 75° C. and allowed to stir overnight. A 96% conversion to a polyhydantoin quaternary with the following formula and a molecular weight of 14,200 was obtained:

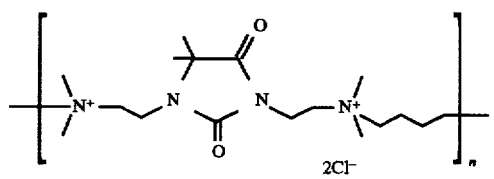

The resulting polyhydantoin quaternary was designated Formula V.

EXAMPLE VI

Preparation of poly[(4,4-dimethyl-2,5-dioxo-1,3-imidazolidinediyl-1,2-ethanediyl(dimethyliminio) methylene-1,4-phenylenemethylene (dimethyliminio)-1,2-ethanediyl dichloride]

Water (89.3 grams), hydantoin diamine (I) (54.0 grams, 0.200 mole) and α,α'-dichloro-p-xylene (35.36 grams, 0.202 mole) were charged into a 250 milliliter reaction flask. The mixture was heated to 85° C. and allowed to react overnight. Analysis indicated 95% conversion to a polyhydantoin quaternary with the following structure and a molecular weight of 17,000:

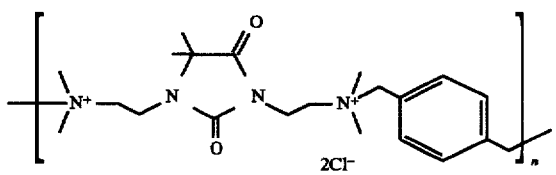

The resulting polyhydantoin quaternary was designated Formula VI.

EXAMPLE VII

Preparation of poly[(4,4-dimethyl-2,5-dioxo-1,3-imidazolidinediyl-1,2-ethanediyl(dimethyliminio)-1,2-ethanediyl(dimethyliminio)-1,2-ethanediyl dichloride]

(A) Prepared via the reaction of hydantoin dichloride (I) with N,N,N',N'-tetramethylethylene diamine Into a 450 milliliter Parr autoclave was charged hydantoin dichloride (I) (51.60 grams, 0.202 moles), ethanol (60 grams), N,N,N',N'-tetramethylethylene diatine (23.2 grams, 0.200 moles), water (15 grams) and sodium carbonate (2.0 grams). The reaction was heated to 100° C. for 6–8 hours. The reaction was monitored by titrating the amount of residual unreacted amine and formation of quaternary compound. At the end of the reaction, the analysis indicated a 77% conversion to polyhydantoin quaternary with structure of Formula (VII).

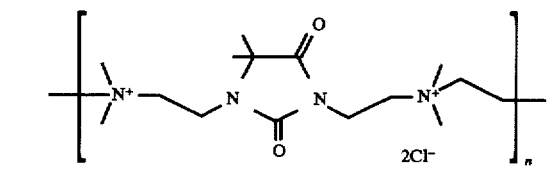

(B) Preparation via the reaction of hydantoin diamine (II) with 1,2-dichloroethane.

Into a 450 milliliter Parr autoclave was charged hydantoin diamine (II) (54.0 g, 0.202 mole), 1,2 dichloroethane (20.6 g, 0.206 mole) and water 74.4 g. The reaction mixture was heated to 100° C. for 3 hours. Analysis indicated a 62% conversion to polyhydantoin quaternary with structural Formula (VII).

EXAMPLE VIII

Preparation of poly[(4,4-dimethyl-2,5-dioxo-1,3-imidazolidinediyl-1,2-ethanediyl(dimethyliminio)-2-butene-1,4-diyl(dimethyliminio)-1,2-ethanediyl dichloride]

Water (79.25 grams), 1,4-dichlorobutene (25.25 grams, 0.202 mole) and hydantoin diamine (1) (54 grams, 0.200 mole) were charged into a 250 milliliter reaction flask. The reaction mixture was heated to 75° C. overnight. Analysis indicated a 93% conversion to a polyhydantoin quaternary with the following formula:

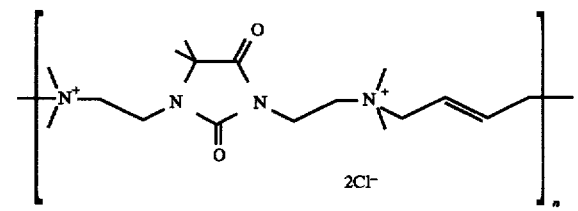

This polyhydantoin quaternary was designated Formula VIII.

EXAMPLE IX

Preparation of poly[(4,4-dimethyl-2,5-dioxo-1,3-imidazolidinediyl-1,2-ethanediyl(dimethyliminio)-1,2-ethanediyl chloride]

Water (105.1 grams), hydantoin diamine (II) (54 grams, 0.200 mole) and hydantoin diamine (I) (51.1 grams, 0.202 mole) was charged into a 450 milliliter Parr autoclave. The reaction mixture was heated up to 80°–100° C. and stirred at this temperature range for a total of approximately 24 hours. Analysis indicated 89% conversion to a polyhydantoin quaternary having the following structure:

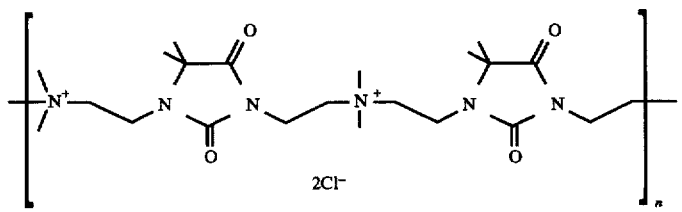

This polyhydantoin quaternary was designated Formula IX.

EXAMPLE X

Preparation of poly[(4,4-dimethyl-2,5-dioxo-1,3-imidazolidinediyl-1,2-ethanediyl(dimethyliminio)-2-butyne-1,4-diyl(dimethyliminio-1,2-ethanediyl dichloride]

Water (78.8 grams), hydantoin diamine (II) (54.0 grams, 0.200 mole) and 1,4-dichloro-2-butyne (24.8 grams, 0.202 mole) were charged into a 250 milliliter reaction flask. The reaction mixture was heated to 45° C. An exotherm was observed.

The mixture was stirred at 45° C. for 2 hours. Analysis indicated a 98% conversion to a polyhydantoin quaternary having the following structure:

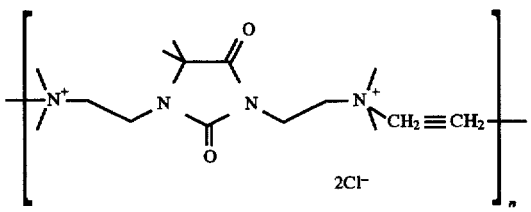

This polyhydantoin quaternary was designated Formula X.

EXAMPLE XI

Preparation of poly[(4,4-dimethyl-2,5-dioxo-1,3-imidazolidinediyl-1,2-ethanediyl(dimethyliminio)-1,12-dodecanediyl-(dimethyliminio)-1,2-ethanediyl dibromide]

Deionized water (73.0 grams), hydantoin diamine (II) (40.5 grams, 0.150 mole) and 1,12-dibromododecane (49.75 grams, 0.152 mole)-were charged into a 250 milliliter reaction flask. The reaction mixture was heated to 95° C. for 8 hours. Analysis indicated an 88% conversion to a polyhydantoin quaternary having the following structure:

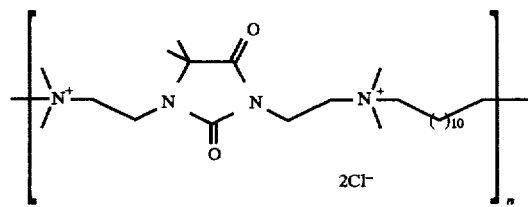

This polyhydantoin quaternary was designated Formula XI.

EXAMPLE XII

Preparation of poly[(4,4-dimethyl-2,5-dioxo-1,3-imidazolidinediyl-1,2-ethanediyl(dimethyliminio)-1,4-butanediyl(dimethyliminio)-1,2-ethanediyl diiodide]

Deionized water (105.86 grams), hydantoin diamine (II) (40.5 grams, 0.150 mole) and 1,4-diiodobutane (46.95 grams, 0.152 mole) were charged into a 250 milliliter reaction flask. The reaction mixture was heated to 85° C. for 1½ hours.

Analysis indicated a 97% conversion to a polyhydantoin quaternary having the following structure:

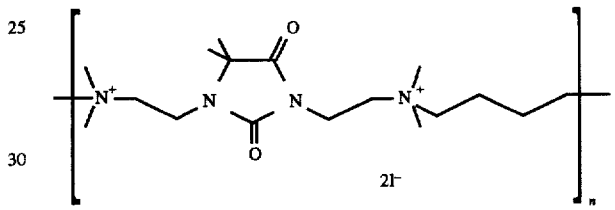

This polyhydantoin quaternary was designated Formula XII.

EXAMPLE XIII

Preparation of poly[(4,4-dimethyl-2,5-dioxo-1,3-imidazolidinediyl-1,2-ethanediyl(dimethyliminio)(2-hydroxy-1,3-propanediyl(dimethyliminio-1,2-ethanediyl bromide chloride]

Deionized water (34.0 grams), hydantoin diamine (II) (27.0 grams, 0.100 mole) and 48% HBr (16.86 grams, 0.100.mole) were charged into a 250 milliliter reaction flask. To this solution, epichlorohydrin (9.53 grams, 0.103 mole) was added. The reaction mixture was heated to 85° C. for 4 hours. Analysis indicated a 98.3% conversion to a polyhydantoin quaternary with the following structure:

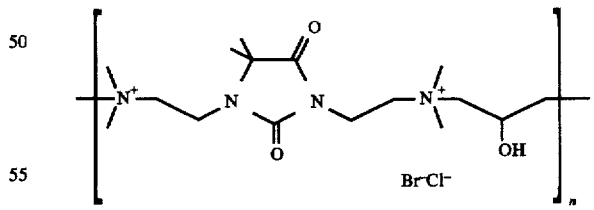

This polyhydantoin quaternary was designated Formula XIII.

EXAMPLE XIV

Preparation of poly[(4,4-dimethyl-2,5-dioxo-1,3-imidazolidinediyl-1,2-ethanediyl(dimethyliminio)(2-hydroxy-1,3-propanediyl)(dimethyliminio-1,2-ethanediyl dibromide]

Deionized water (34.5 grams), hydantoin diamine (II) (27.0 grams, 0.100 mole) and 48% HBr (16.86 grams, 0.100 mole) were charged into a 250 milliliter reaction flask. To this solution, epibromohydrin (14.11 grams, 0.103 mole) was added. The reaction mixture was stirred at 85° C. for 3 hours. Analysis indicated a 98% conversion to a polyhydantoin quaternary with the following structure:

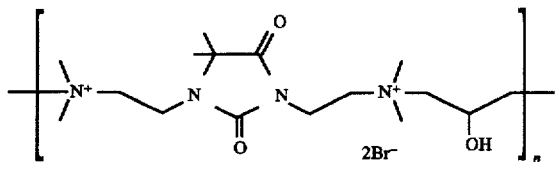

This polyhydantoin quaternary was designated Formula XIV.

EXAMPLE XV

Preparation of poly[(4,4-dimethyl-2,5-dioxo-1,3-imidazolidinediyl-1,2-ethanediyl(dimethyliminio)(2-hydroxy-1,3-propanediyl)(dimethyliminio-1,2-ethanediyl chloride iodide]

Deionized water (34.5 grams), hydantoin diamine (II) (27.0 grams, 0.100 mole) and 47% HI (26.92 grams, 0.100 mole) were charged into a 250 milliliter reaction flask. The reaction mixture was stirred at 85° C. for 3 hours. Analysis indicated a 99% conversion to a polyhydantoin quaternary with the following structure:

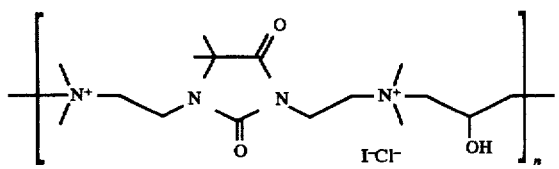

This polyhydantoin quaternary was designated Formula XV.

EXAMPLE XVI

Preparation of 1,3-bis[3-(3-((dimethylamino)propyl)amino)-3-oxopropyl]-5,5-dimethyl hydantoin (Formula XVI)

Into a 3 liter, 4-necked reaction flask equipped with stirrer, thermometer, condenser, Dean-Stark trap and nitrogen inlet tube, 1,3-bis(2-carboxyethyl)-5,5-dimethyl hydantoin (544 grams, 2.00 moles), toluene (100 grams) as solvent and dimethylaminopropylamide (DMAPA, 545 grams, 5.34 moles, Aldrich Chemical Co., WI) were charged. The reaction mixture was heated to reflux. The water generated from the reaction was azeotropically distilled into the Dean-Stark trap and removed. After the water removal, the reaction mixture was heated to approximately 150° C. to remove the toluene and excess DMAPA. A light brown colored paste was obtained with an equivalent weight of 220.

Mass spec (m/e): 440.23 (M), 441.31 (M+1), 442.33 (M+2)

EXAMPLE XVII

Preparation of poly[(4,4-dimethyl-2,5-dioxo-1,3-imidazolidinediyl)(3-oxo-1,3-propanediylimino-1,3-propanediyl(dimethyliminio)(2-hydroxy-1,3-propanediyl)(dimethyliminio)-1,3-propanediylimino-1-oxo-1,3-propanediyl dichloride]

Hydantoin diamine (XVI) (63.8 grams, 0.145 mole), deionized water (86 grams and 36.5% HCl (15.5 milliliters, 0.150 mole) were charged into a 500 milliliter reaction flask. To this solution, epichlorohydrin (13.8 grams) was added. The solution was heated to 85° C. for 6 hours. Analysis indicated a 94% conversion to a polyhydantoin quaternary with the following structure:

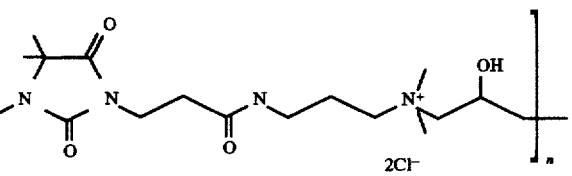

This PHQ was designated Formula XVII.

EXAMPLE XVIII

Preparation of poly[(4,4-dimethyl-2,5-dioxo-1,3-imidazolidinediyl)(3-oxo-1,3-propanediylimino-1,3-propanediyl(dimethyliminio)(2-hydroxy-1,3-propanediyl)(dimethyliminio)-1,3-propanediylimino-1-oxo-1,3-propanediyl bromide chloride Hydantoin diamine (XVI) (63.8 grams, 0.145 mole), deionized water (87 grams) and 36.5% HCl (15.5 milliliters, 0.15 mole) were charged into a 500 milliliter reaction flask. To this solution, epibromohydrin (21 grams, 0.15 mole) was added. The solution was heated at 85° C. for 6 hours. Analysis indicated a 95% conversion to a polyhydantoin quaternary with the following structure:

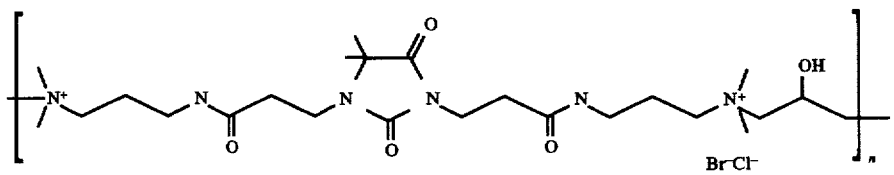

This PHQ was designated Formula XVIII.

EXAMPLE XIX

Evaluation of the Biocidal Properties of Polyhydantoin Quaternaries

Time studies were carried out on seven polyhydantoin quaternaries at 1000 ppm active concentration against five different organisms at 5 different time intervals (days, 1, 2, 3, and 7) using deionized water as positive control:

Formula III from Example III;

Formula IV from Example IV;

Formula V from Example V;

Formula VI from Example VI;

Formula VIII from Example VIII;

Formula IX from Example IX; and

Formula X from Example X.

The test samples are diluted to 1000 ppm active in distilled water and inoculated with one of the five microbial suspensions: *Pseudomonas aeruginosa, Staphylococcus aureus, Staphylococcus choleraesuis, Aspergillus niger* and *Candida albicans*. The concentration of the bacterial suspension immediately after inoculation was between 100,000 and 1,000,000 microorganisms/ml. The results are summarized in Table 2 below.

TABLE 2

| Test Organism | Day 0 | Day 1 | Day 2 | Day 3 | Day 7 |
|---|---|---|---|---|---|
| PHQ Formula III | | | | | |
| Ps. aeruginosa | <10 | <10 | <10 | <10 | <10 |
| S. aureus | <10 | <10 | <10 | <10 | <10 |
| S. choleraesuis | <10 | <10 | <10 | <10 | <10 |
| C. albicans | $2 \times 10^4$ | $5 \times 10^1$ | <10 | <10 | <10 |
| PHQ Formula IV | | | | | |
| Ps. aeruginosa | <10 | <10 | <10 | <10 | <10 |
| S. aureus | <10 | <10 | <10 | <10 | <10 |
| S. choleraesuis | <10 | <10 | <10 | <10 | <10 |
| C. albicans | $2 \times 10^5$ | $2 \times 10^2$ | <10 | <10 | <10 |
| PHQ Formula V | | | | | |
| Ps. aeruginosa | <10 | <10 | <10 | <10 | <10 |
| S. aureus | <10 | <10 | <10 | <10 | <10 |
| S. choleraesuis | <10 | <10 | <10 | <10 | <10 |
| C. albicans | $1 \times 10^4$ | $2 \times 10^2$ | <10 | <10 | <10 |
| PHQ Formula VI | | | | | |
| Ps. aeruginosa | <10 | <10 | <10 | <10 | <10 |
| S. aureus | <10 | <10 | <10 | <10 | <10 |
| S. choleraesuis | <10 | <10 | <10 | <10 | <10 |
| C. albicans | $3 \times 10^4$ | <10 | <10 | <10 | <10 |
| PHQ Formula VIII | | | | | |
| Ps. aeruginosa | <10 | <10 | <10 | <10 | <10 |
| S. aureus | <10 | <10 | <10 | <10 | <10 |
| S. choleraesuis | <10 | <10 | <10 | <10 | <10 |
| C. albicans | $2 \times 10^3$ | $<2 \times 10^1$ | <10 | <10 | <10 |

TABLE 2-continued

| Test Organism | Day 0 | Day 1 | Day 2 | Day 3 | Day 7 |
|---|---|---|---|---|---|
| PHQ Formula IX | | | | | |
| Ps. aeruginosa | $1.3 \times 10^4$ | <10 | <10 | <10 | <10 |
| S. aureus | <10 | <10 | <10 | <10 | <10 |
| S. choleraesuis | <10 | <10 | <10 | <10 | <10 |
| C. albicans | $1.1 \times 10^2$ | <10 | <10 | <10 | <10 |
| PHQ Formula X | | | | | |
| Ps. aeruginosa | <10 | <10 | <10 | <10 | <10 |
| S. aureus | <10 | <10 | <10 | <10 | <10 |
| S. choleraesuis | <10 | <10 | <10 | <10 | <10 |
| C. albicans | $3 \times 10^4$ | <10 | <10 | <10 | <10 |
| Positive Control (deionized water) | | | | | |
| Ps. aeruginosa | $3.7 \times 10^7$ | $4.9 \times 10^7$ | $3.7 \times 10^7$ | $5.6 \times 10^7$ | |
| S. aureus | $4 \times 10^7$ | $3.7 \times 10^7$ | $2 \times 10^7$ | $6 \times 10^7$ | $1 \times 10^8$ |
| S. choleraesuis | $5 \times 10^6$ | $1.1 \times 10^7$ | $8 \times 10^6$ | $9 \times 10^6$ | |
| C. albicans | $1.1 \times 10^7$ | $6 \times 10^6$ | $5 \times 10^6$ | $5 \times 10^6$ | |

As shown by the results, the PHQs have unexpected superior biocidal activity as to all tested organisms. Each PHQ tested practically eliminated each organism by Day 2 of testing.

EXAMPLE XX

Evaluation of the Algicidal Properties of Polyhydantoin Quaternaries

The following polyhydantoin quaternaries were evaluated for algicidal efficacy against *Chlorella pyrenoidosa* (#1230 from University of Texas Culture Collection of Algae):

Formula III from Example III;

Formula IV from Example IV;

Formula V from Example V; and

Formula VI from Example VI.

The inhibitory zones as well as the minimum algicidal concentrations (MCC) were determined. The inhibitory zone is the minimum concentration where the organism is still viable but not multiplying. The MCC is the lowest concentration tested which kills the organism.

For each sample tested, 0.5 ml of inoculum containing 5,000,000 cells/ml in Bristol's Solution was added to each 5 ml biocide or control tube containing 50, 10, 5, or 1 ppm biocide. The test tubes were incubated at room temperature over cool-white fluorescent lighting on a 16/8 hour light/dark cycle. At a contact time of one day and 7 days, the biocide tubes were read. The tubes were compared to: controls and scored for greenness. An amount of 0.1 ml was then subcultured from the biocide tubes to 10 ml of fresh Bristol's Solution. These subcultured tubes were held an extended length of time to ensure recovery of injured but viable cells. After 28 days of growth, they were scored for greenness. The results were compared with WSCP [poly{oxyethylene(dimethyliminio)ethylene (dimethyliminio)ethylene dichloride}] (Buckmann laboratories) and summarized in Table 3.

TABLE 3

| Compound | 1 Day Exposure | | 7 Day Exposure | |
|---|---|---|---|---|
| (Formula) | Inhibitory | MCC | Inhibitory | MCC |
| III | 5 | 10 | >1 and <5 | 5 |
| IV | 5 | 10 | >1 and <5 | 5 |
| V | 5–10 | 50 | >1 and <5 | 5 |
| VI | 5 | 10 | >1 and <5 | 5 |
| WSCP | 10 | 50 | >1 and <5 | 5 |

The data showed that, with the exception of Formula V, these polyhydantoin quaternaries are more efficacious as an algicide than WSCP.

EXAMPLE XXI

Evaluation of the Foaming Properties of the Polyhydantoin Quaternaries

The polyhydantoin quaternaries were evaluated at 15 ppm active in a dynamic recirculation apparatus with no aspiration. The dynamic foam apparatus consists of a 24" high, 4" diameter glass cylinder draining to-a centrifugal pump which recirculates the test volume to a nozzle mounted 43 cm above the surface of the liquid in the glass cylinder. The foam height is measured from the liquid surface to the top of the foam bed. Synthetic cooling water with 500 ppm water hardness as $CaCO_3$ was used. The following foaming properties were evaluated.

a. Equilibrium foam height—foam heights were recorded at 5 minute intervals until equilibrium heights were established.
b. Foam half-life—the time required to recede to one-half of the equilibrium foam height upon stopping recirculation.

The results were compared with alkyl ($C_{14}$ 50%; $C_{12}$ 40%; $C_{16}$ 10%) dimethylbenzyl ammonium chloride (13arquat MB-50, Lonza Inc., Fair Lawn, N.J.) and summarized in Table 4.

TABLE 4

| PHQ | Equilibrium Foam Height (cm) | Half-life (sec) |
|---|---|---|
| IV (A) | 0.5 | 1 |
| IV (B) | 1.0 | 1 |
| IV (C) | 1.0 | 1 |
| IV | 1.0 | 1 |
| III | 1.0 | 1 |
| V | 1.0 | 1 |
| XI | 1.0 | 2 |
| XII | 0 | 0 |
| XIII | 0.5 | 0 |
| XIV | 0 | 0 |
| XV | 0 | 0 |
| XVII | 0 | 0 |
| XVIII | 0 | 0 |
| Barquat MB-50 | >40 | >120 |

These results indicated that polyhydantoin quats are extremely low foaming and fast foam breaking when compared with ADBAC quaternary ammonium compounds.

EXAMPLE XXII

Evaluation of Irritancy of Polyhydantoin Quat Compounds

A BCOP (Bovine Corneal Opacity and Permeability) assay was carried out on polyhydantoin quat compounds of the invention using a test system developed by Gautheron et al.L, "Bovine Corneal Opacity and Permeability Test: An in Vitro Assay of Ocular Irritancy" *Fundamental and Applied Toxicology*, 18: 442–449 (1992). The system measures two important properties which are predictive of irritation: corneal opacity and permeability. The following classification system for in vitro scores was used:

from 0–24=mild irritant
from 25.1 to 55=moderate irritant
from 55.1 and above=severe irritant Two polyhydantoin quaternary compounds, having formulas IV and V, were tested using known antimicrobial compositions, ethanol and a didecyl dimethyl ammonium chloride (Bardac 2250, Lonza Inc., Fair Lawn, N.J.), as controls. The test samples were prepared as 0.1% active solutions in distilled water.

In this test, bovine corneas (from slaughterhouse animals) were mounted between two tissue culture media reservoirs in holders which function both as treatment chambers and as cuvettes for subsequent direct measurement of corneal opacity. The test substances (0.75 ml) were introduced into the anterior compartments of the holders. The holders were slightly roated to ensure uniform covering of the test substances over the cornea, and incubated at 32°±1° C. for 10 minutes. The test substances were removed and the epithelium washed at least 3 times with Minumum Essential Medium Eagle (MEM) supplemented with 1% Fetal Bovine Serum (complete MEM) until the medium was clear. The corneas were incubated at 32°±1° C. for 2 hours.

After completion of the incubation period, the resultant damage was assessed both by quantitative measurement of opacity change, and by indirect measurement of corneal cell damage as evidenced by increased passage of fluorescein. The in vitro scores are summarized below:

| COMPOUND | BCOP SCORE |
|---|---|
| Formula IV | –1.0 |
| Formula V | –0.8 |
| Ethanol | 68.7 |
| Bardac 2280 | 99 |

These data indicated that the polyhydantoin quaternary compounds of formulas IV and V were non-irritating, while antimicrobial compositions of the prior art caused severe irritation.

We claim:

1. A polymeric hydantoin quaternary compound, wherein said compound has the following formula:

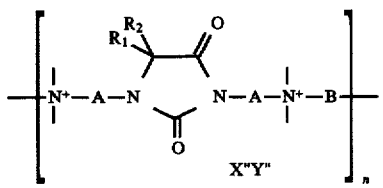

wherein

X and Y are Cl, Br, or I;

$R_1$ and $R_2$, which may be the same or different, are selected from the group consisting of hydrogen; alkyl groups of 1 to 18 carbons; alkenyl groups of 1 to 18 carbons; alkynyl groups of 1 to 18 carbons; or substituted derivatives thereof where the substitution may be alkyl or alkoxy or phenyl groups; $R_1$ and $R_2$ taken together may be a cycloaliphatic group of 4 or 5 carbon atoms; A and B may be —$(CH_2)_m$—; —$(CH_2)_m CH=CH(CH_2)_p$—; —$(CH_2)_m C\equiv C(CH_2)_p$—; —$(CH_2)_m O(CH_2)_p$—; —$(CH_2)_m CHOH(CH_2)_p$—; —$(CH_2)_m NC(O)(CH_2)_p$—; or —$(CH_2)_m C_6H_4 (CH_2)_p$—; m and p may be from 1 to 20; and n, the degree of polymerization, may be from 1 to 3,000.

2. The polymeric hydantoin quaternary compound of claim 1, wherein $R_1$ and $R_2$ are methyl groups; X and Y are two $Cl^-$ ions; A is —$(CH)_2$— and B is —$CH_2OCH_2$—; —$CH_2CHOHCH_2$—; —$(CH_4$—; —$(CH_2)_2$—; —$CH_2CH=CHCH_2$—; —$CH_2C\equiv CCH_2$—; or —$(CH_2)C_6H_4(CH_2)$—.

3. The polymeric hydantoin quaternary compound of claim 1, wherein $R_1$ and $R_2$ are methyl groups; X is a $Cl^-$ or $Br^-$ ion; Y is a $Cl^-$ ion; A is —$(CH_2)_3NCO(CH_2)_2$—; and B is —$CH_2COHCH_2$—.

4. The polymeric hydantoin quaternary compound of claim 1, wherein $R_1$ and $R_2$ are methyl groups; X is a $Br^-$ or $I^-$ ion; Y is $Br^-$ or $Cl^-$ when X is $Br^-$ or Y is $Cl^-$ when X is $I^-$; A is —$(CH_2)_2$— and B is —$CH_2CHOHCH_2$—.

5. A method for making a polymeric hydantoin quaternary ammonium compound, comprising:
   a. chlorinating 1,3-bis(2-hydroxy A)-5,5-$R_1R_2$ hydantoin with thionyl chloride or phosphorus trichloride to obtain 1,3-bis(2-chloro A)-5,5-$R_1R_2$ hydantoin, wherein $R_1$ and $R_2$ which may be the same or different, are selected from the group consisting of hydrogen; alkyl groups of 1 to 18 carbons; alkenyl groups of 1 to 18 carbons; alkynyl groups of 1 to 18 carbons; or substituted derivatives thereof where the substitution may be alkyl or alkoxy or phenyl groups; $R_1$ and $R_2$ taken together may be a cycloaliphatic group of 4 or 5 carbon atoms; and A is —$(CH_2)_m$—; —$(CH_2)_m CH=CH(CH_2)_p$—; —$(CH_2)_m C\equiv C(CH_2)_p$—; —$(CH_2)_m O(CH_2)_p$—; —$(CH_2)_m CHOH(CH_2)_p$—; —$(CH_2)_m NC(O)(CH_2)_p$—; or —$(CH_2)_m C_6H_4 (CH_2)_p$—; m and p are 1–20;
   b. aminating said 1,3-bis(2-chloro A)-5,5-$R_1R_2$ hydantoin with dimethylamine to form a hydantoin-based diamine;
   c. polymerizing said hydantoin-based diamine with an organic dihalide or epichlorohydrin to obtain said polymeric hydantoin quaternary ammonium compound; and
   d. polymerizing said hydantoin-based dichloride with an organic diamine to obtain said polymeric hydantoin quaternary ammonium compound.

6. The method of claim 5, wherein said polymeric hydantoin quaternary ammonium compound is the composition of claim 1.

7. The method of claim 5, wherein 1,3-bis(2-hydroxy A)-5,5-$R_1R_2$ hydantoin is 1,3-bis(2-hydroxyethyl)-5,5-dimethyl hydantoin.

8. A method for making a polymeric hydantoin quaternary ammonium compound, comprising:
   a. aminating 1,3-bis(2-carboxyethyl)-5,5-$R_1R_2$ hydantoin with dimethylaminopropylamine to form a hydantoin-based diamine, wherein $R_1$ and $R_2$, which may be the same or different, are selected from the group consisting of hydrogen; alkyl groups of 1 to 18 carbons; alkenyl groups of 1 to 18 carbons; alkynyl groups of 1 to 18 carbons; or substituted derivatives thereof where the substitution may be alkyl or alkoxy or phenyl groups; $R_1$ and $R_2$ taken together may be a cycloaliphatic group of 4 or 5 carbon atoms; and
   b. polymerizing said hydantoin-based diamine with an organic dihalide or epichlorohydrin to obtain said polymeric hydantoin quaternary ammonium compound.

9. The method of claim 8, wherein said polymeric hydantoin quaternary ammonium compound is the composition of claim 1.

10. The method of claim 8, wherein said 1,3-bis(2-carboxyethyl)-5,5-$R_1R_2$ hydantoin is 1,3-bis(2-carboxyethyl)-5,5-dimethyl hydantoin.

11. A method for making a polymeric hydantoin quaternary ammonium compound, comprising:
   a. chlorinating 1,3-bis(2-hydroxy A)-5,5-$R_1R_2$hydantoin, with thionyl chloride or phosphorous trichloride, wherein $R_1$ and $R_2$, which may be the same or different, groups of 1 to 18 carbons; alkynyl groups of 1 to 18 carbons; or substituted derivatives thereof where the substitution may be alkyl or alkoxy or phenyl groups; $R_1$ and $R_2$ taken together may be a cycloaliphatic group of 4 or 5 carbon atoms: A and B may be —$(CH_2)_m$—; —$(CH_2)_m CH=CH(CH_2)_p$—; —$(CH_2)_m C\equiv C(CH_2)_p$—; —$(CH_2)_m O(CH_2)_p$—; —$(CH_2)_m CHOH(CH_2)_p$—; —$(CH_2)_m NC(O)(CH_2)_p$—; or —$(CH_2)_m C_6H_4(CH_2)_p$—; m and p may be from 1 to 20; and n, the degree of polymerization, may be from 1 to 3,000;
   b. aminating the product of step (a) with a di-substituted amine to form a hydantoin-based diamine; and
   c. polymerizing said hydantoin-based diamine with an organic dihalide or epichlorohydrin to obtain said polymeric hydantoin quaternary ammonium compound.

12. The polymeric hydantoin quaternary compound of claim 1 wherein the alkyl groups, the alkenyl groups, and the alkynyl groups contain from 1 to 6 carbons, and the degree of polymerization is from 1 to 300.

13. The method of claim 5 wherein the alkyl groups, the alkenyl groups, and the alkynyl groups have from 1 to 6 carbons.

14. The method of making a polymeric hydantoin quaternary ammonium compound of claim 8 wherein the alkyl groups, the alkenyl groups, and the alkynyl groups have from 1 to 6 carbons.

* * * * *